United States Patent
Suter et al.

[45] Sept. 12, 1972

[54] ASYMMETRICAL DIAMIDES OF TETRAIODOTEREPHTHALIC ACID

[72] Inventors: Hans Suter, Dorflingen; Hans Zutter; Josef Brunner, both of Schaffhausen, all of Switzerland

[73] Assignee: Eprova Aktiengesellschaft, Schaffhausen, Switzerland

[22] Filed: Nov. 10, 1969

[21] Appl. No.: 875,594

[30] Foreign Application Priority Data

Nov. 20, 1968 Switzerland............17276/68

[52] U.S. Cl......260/326.3, 260/247.2 A, 260/518 A, 260/471 A, 424/5
[51] Int. Cl.............................................C07d 27/04
[58] Field of Search...........260/326.3, 518 A, 471 A, 260/247.2 A

[56] References Cited

UNITED STATES PATENTS 3,042,715  7/1962  Obendorf et al...........260/518

*Primary Examiner*—Alex Mazel
*Assistant Examiner*—Joseph A. Narcavage
*Attorney*—Kelman and Berman

[57] ABSTRACT

Asymmetrical diamides of tetraiodoterephthalic acid having the general formula $$R_3OOC-X-N-CO-C_6I_4-CO-N-R_1$$
$$\phantom{R_3OOC-X-}R\phantom{-CO-C_6I_4-CO-}R_2 \quad (I)$$

are relatively non-toxic and are preferentially accumulated in the gall bladder of warm-blooded animals when ingested, injected or applied rectally. Because of their high iodine content, they are effective contrast agents, particularly in cholecystography. They are prepared from mixed anhydrides of tetraiodoterephthalic acid by sequential reaction with amines of the formulas

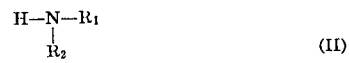

and

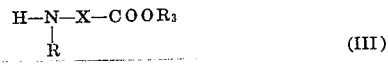

In these formulas, X is lower alkylene or phenyl-lower-alkylene, R is hydrogen, lower alkyl or phenyl-lower alkyl. X and R may also jointly be alkylene forming a heterocyclic ring with the associated nitrogen atom. $R_1$ is hydrogen or lower alkyl, $R_2$ is lower alkyl, carboxy-lower-alkyl, or lower-carbalkoxy-lower-alkyl or $R_1$ and $R_2$ jointly are lower-alkyleneoxy-lower-alkylene, carboxy-lower-alkylene or lower-carbalkoxy-lower-alkylene. $R_3$ is hydrogen, lower alkyl, non-toxic amine or non-toxic alkali metal or alkaline earth metal, the amine or metal being selected to make the diamide water soluble.

12 Claims, No Drawings

ASYMMETRICAL DIAMIDES OF TETRAIODOTEREPHTHALIC ACID

This invention relates to X-ray contrast media, and particularly to iodine bearing organic compounds suitable for use as contrast agents in cholecystography, and to the preparing and compounding of such compounds.

Several iodine-bearing organic compounds have been in clinical use heretofore as contrast agents in cholecystography. The known contrast agents are relatively toxic as compared to similar compounds presently used for visualizing the blood vessels and the urinary tract, and they do not accumulate in the gall bladder in sufficient amounts to give adequate opacity when used in safe amounts.

It has now been found that certain asymmetrical diamides of tetraiodoterephthalic acid combine the three principal properties necessary for good cholecystographic contrast agents in a more favorable manner than was available until now. Because the compounds contain four iodine atoms in the molecule, their iodine content and the resulting opacity to X-rays are high. The compounds tend to accumulate in the gall bladder when applied by mouth, rectally or parenterally. Their toxicity in effective doses is too low to produce significant side effects.

The compounds of the invention have the formula

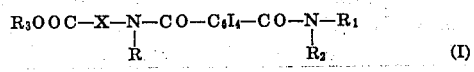

$$R_3OOC-X-N-CO-C_6I_4-CO-N-R_1$$
$$\phantom{R_3OOC-X-N-}R\phantom{-CO-C_6I_4-CO-}R_2 \qquad (I)$$

wherein X is lower alkylene or phenyl-lower-alkylene, R is hydrogen, lower alkyl or phenyl-lower-alkyl and X and R jointly may be lower alkylene forming a heterocyclic ring with the associated nitrogen atom. $R_1$ is hydrogen or lower alkyl, $R_2$ is lower alkyl, carboxy-lower alkyl, or lower-carbalkoxy-lower-alkyl, and $R_1$ and $R_2$ jointly may be lower-alkyleneoxy-lower-alkylene, carboxy-lower-alkylene, or lower-carbalkoxy-lower-alkylene. $R_3$ is hydrogen, lower alkyl, non-toxic amine or non-toxic alkali metal or alkaline earth metal, and the amine or metal is selected to make the compound water soluble. The term lower will be understood to limit the alkyl or alkylene radical referred to to not more than five carbon atoms.

Best results are obtained in cholecystography with the compounds of the invention which are either carboxylic acids or metal or amine salts of such carboxylic acids. While there are some indications of limited utility as contrast agents for the esters of carboxylic acids encompassed by the above formula, the esters are mainly useful as intermediate in the preparation of the free acids and of their salts.

Representative compounds of the invention (Compounds A to R) are listed below together with tetraiodophthalic acid (Compound S) and similar compounds (Compounds T to V) which have been disclosed, respectively, in the German Patent No. 1,112,251, U.S. Pat. No. 2,247,880, and German Patent 1,066,707. For comparison purposes, reference will be had hereinbelow to derivatives of triiodobenzene which are in current clinical use or were proposed heretofore as contrast agents in cholecyctography: adipiodone or iodipamide (Compound W), ioglycamic acid (Compound Y) and iopanoic acid (Compound Z).

A. 4-(4-N-α-Carboxypropylcarbamyl-2,3,5,6-tetraiodobenzoyl)-morpholine
B. 4-(4-N-α-Carboxybutylcarbamyl-2,3,5,6-tetraiodobenzoyl)-morpholine
C. 4-(4-N-α-Carboxy-γ-methylbutylcarbamyl-2,3,5,6-tetraiodobenzoyl)-morpholine
D. 4-(4-N-Methyl-N-carboxymethylcarbamyl-2,3,5,6-tetraiodobenzoyl)-morpholine
E. 4-(4-γ-Carboxypiperidinocarbonyl-2,3,5,6-tetraiodobenzoyl)-morpholine
F. 4-[4-(2'-Carboxy-pyrrolidino)-carbonyl-2,3,5,6-tetraiodobenzoyl]-morpholine
G. β-(4-N-Methylcarbamyl-2,3,5,6-tetraiodobenzyl)amino-α-phenyl-propionic acid
H. 1-(4-N-Methylcarbamyl-2,3,5,6-tetraiodobenzoyl)-pyrrolidine-2-carboxylic acid
I. N-(4-N'-Carboxymethylcarbamyl-2,3,5,6-tetraiodobenzoyl)-N-methyl-amino-acetic acid
K. β-(4-N-Carboxymethylcarbamyl-2,3,5,6-tetraiodobenzoyl)-amino-α-ethyl-propionic acid
L. β-(4-N-Carboxymethylcarbamyl-2,3,5,6-tetraiodobenzoyl)-amino-α-phenyl-propionic acid
M. N-(4-N'-Carboxymethylcarbamyl-2,3,5,6-tetraiodobenzoyl)-N-ethyl-amino-acetic acid
N. N-(4-N'-Carboxymethylcarbamyl-2,3,5,6-tetraiodobenzoyl)-N-benzoyl-amino-acetic acid
O. 1-(4-N-Carboxymethylcarbamyl-2,3,5,6-tetraiodobenzoyl)-pyrrolidine-2-carboxylic acid
P. β-(4-N-Methyl-N-carboxymethylcarbamyl-2,3,5,6-tetraiodobenzoyl)-amino-α-ethylpropionic acid
Q. β-[4-(2'-Carboxypyrrolidine)-carbonyl-2,3,5,6-tetraiodobenzoyl]-amino-α-ethylpropionic acid
R. 1-(4-N-Methyl-N-carboxymethylcarbamyl-2,3,5,6-tetraiodobenzoyl)-pyrrolidine-2-carboxylic acid
S. Tetraiodophthalic acid
T. Morpholide of tetraiodophthalic acid
U. Tetraiodoterephthalic acid
V. N,N'-Tetraiodoterephthalic acid diglycide.

Table I lists toxicity values and data on bilitropism for Compounds A to Z. The toxicity values were determined on mice by standardized conventional procedures and are expressed as $DL_{50}$ in mg/kg. The compounds were applied orally and/or by intravenous injection of aqueous solutions of their sodium and/or N-methylglucamine salts over a period of 30 seconds. Not all tests were performed on all compounds.

To evaluate bilitropism, the tendency of a compound to be excreted preferentially by the liver with the bile, rabbits were injected intravenously with aqueous salt solutions of the free acids listed above, and the percentages of the active material excreted through the gall bladder and with the urine were determined after three hours. The listed ration of excretion with the bile to excretion with the urine is a measure of bilitropism.

TABLE I

| Compound | Toxicity, $DL_{50}$ Oral | I.V. | Excretion, % Bile | Urine | Ratio |
|---|---|---|---|---|---|
| A | 4,000+ | 2,200 | 30 | 39 | 0.77 |
| B | 8,000+ | 1,600 | 38 | 25 | 1.52 |
| C | 8,000+ | 1,400 | 65 | 23 | 2.83 |
| D | 3,350 | 720 | 29 | 7 | 4.1 |
| E | 3,330 | 1,050 | 36 | 8 | 4.5 |
| F | 4,000+ | 1,420 | 45 | 18 | 2.5 |
| G | 8,000+ | | 17 | 2.7 | 6.3 |
| H | | 2,300 | | | |
| I | | 7,000 | 30 | 40 | 0.75 |
| K | | 7,400 | 31 | 40 | 0.75 |

| Compound | | | | |
|---|---|---|---|---|
| L | 2,800 | 59 | 15.5 | 3.8 |
| M | 7,300 | 30 | 28 | 1.07 |
| N | 3,780 | 63 | 34 | 1.85 |
| O | 6,400 | 41 | 42 | 0.97 |
| P | 4,000+ | 33.5 | 32 | 1.01 |
| Q | 4,000+ | 37.5 | 34 | 1.1 |
| R | 4,000+ | 35.5 | 28 | 1.27 |
| S | 100 | | | |
| T | 670 | 11 | 41 | 0.27 |
| U | 5,300 | 2 | 80 | 0.025 |
| V | 10,000+ 6,000 | 24 | 55 | 0.44 |
| W | 2,400 | 37 | 38 | 0.98 |
| Y | 4,200 | 30 | 41 | 0.73 |
| Z | 1,540 285 | 28 | 13 | 2.15 |

Table II lists the results obtained in the cholecystography of dogs (1) and/or cats (2) at various times after application of the tested compounds by intravenous injection at a dosage of 100 mg compound per kilogram body weight (a) or of 165.6 mg iodine equivalent per kg (b). The density of the gall bladder shadow in each X-ray image and the contrast quality of the image were evaluated by the method of J.O. Hoppe [J. Am. Pharm. Assn. Sci. Ed. 48, 368–379, (1959)]. On the Hoppe scale, 0 indicates a negative result, 1 weak, 2 adequate, 3 good, and 4 excellent.

TABLE II

| Compound | Animal/Dosage | 1 hr. | 2 hrs. | 4 hrs. | 6 hrs. | 8 hrs. | 24 hrs. |
|---|---|---|---|---|---|---|---|
| A | 2/a | | | 2.8 average | | | |
| A | 2/a | 0 | 1 | 2.5 | 2.7 | 2.7 | |
| C | 2/a | 0.5 | 1 | 2.5 | 3 | 3.5 | |
| F | 1/a | | 3 | 3.5 | 2 | | |
| H | 2/a | 1 | 2.5 | 3.25 | 3.5 | 3.25 | |
| | 1/b | 2.5 | 3 | 3 | 3 | 3 | 2 |
| I | 2/a | 1 | 1.5 | 2 | 2.5 | 2.5 | |
| | 1/b | 2 | 2.5 | 3 | 3.5 | 3.5 | 2 |
| K | 1/a | 2 | 2 | 3 | 3 | 2 | 1.5 |
| L | 1/a | 2.5 | 3 | 3 | 3 | 3.5 | 0.5 |
| M | 1/a | 2 | 2.25 | 2.25 | 2.25 | 1.75 | 1 |
| | 2/a | 0.5 | 1 | 1.5 | 2 | 2.5 | 2 |
| N | 2/a | | 1.5 | 2.5 | | 3 | 2.5 |
| O | 2/a | | 0.5 | 2 | | 2.5 | 1.5 |
| P | 1/a | | 1.5 | 2 | 2 | 2 | 0.5 |
| Q | 1/a | | 1 | 1.5 | 1.5 | 1 | |
| R | 1/a | | 1.5 | 2 | 2 | 2 | 0.5 |
| V | 1/a | | 0.5 | 0.5 | | 0.5 | 0 |
| Y | 1/a | 0.5 | 1 | 1 | 1 | 1.25 | 0.5 |
| Z | 2/a | 0 | 0.5 | 1.75 | 2.5 | 3 | |

As is evident from the Tables, Compound S is too toxic to permit its safe use on humans. Compounds T,U,V are discharged mainly or almost exclusively with the urine, and only unsatisfactory amounts accumulate in the gall bladder. The compounds of the invention compare favorably in their toxicity and bilitropism with, or are superior to, Compounds W to Z which have been in clinical use for some time.

The compounds of the invention are prepared from the reactive diacyl derivatives of tetraiodoterephthalic acid by reaction with two different amines of the formulas

and

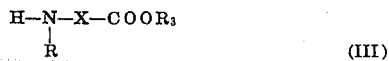

wherein X, R, $R_1$, $R_2$ have the same meaning as in Formula (I) above. The reaction product may be saponified if $R_3$ is alkyl, and the free acid or salt so obtained may be converted to another salt or to the free acid if so desired. The asymmetrical diamide ultimately obtained is combined with an inert excipient in a conventional manner to produce an injectable, ingestible or rectally applicable composition.

Generally, the reactive diacyl derivative of tetraiodoterephthalic acid is reacted first with an amine of one of the two formulas (II) and (III) until a monoamide of tetraiodoterephthalic acid having one reactive acyl derivative group is formed, and the monoamide is thereafter reacted with the amine of the other formula. The sequence in which the amines are reacted with the tetraiodoterephthalic acid derivative is not important, and similar yields are usually obtained by either sequence of reactions.

The preferred reactive diacyl derivatives of tetraiodoterephthalic acid are the mixed anhydrides with inorganic and organic acids such as the hydrogen halides and azides, tetraiodophthaloyl dichloride, (dibromide, diiodine or diazide), oxygen and phosphorus bearing acids (tetraiodoterephthaloyl diphosphite), carboxylic acids (1,4-bisacyl-oxycarbonyl-2,3,5,6-tetraiodobenzene), or the semi-esters of carbonic acid (1,4-bisalkoxycarbonyloxycarbonyl-2,3,5,6-tetraiodobenzene).

The diamides of the invention in the free acid form, in which $R_3$ is hydrogen, are generally insoluble or poorly soluble in water, but readily dissolve in alkaline aqueous media. They are therefore used conveniently in dosage units for oral application. The salts with non-toxic alkali metals and alkaline earth metals and with the non-toxic amines commonly employed in pharmaceutical chemistry for solubilizing therapeutically or otherwise effective anionic radicals are soluble in water or almost miscible with water. Such soluble non-toxic salts include those of sodium, lithium, calcium, magnesium, and of the non!-toxic alkanolamines such as diethanolamine or N-methylglucamine. The morpholine salts are also generally water soluble and many other amine salts are obviously available.

The toxicity, bilitropism, and iodine content of each salt are practically unaffected by the associated cationic component, and not significantly different from the corresponding properties of the free acids.

The following Examples 1–16 are further illustrative of the compounds of the invention and of the methods of preparing and using the same.

EXAMPLE 1

4-(4-N-α-Carboxybutylcarbamyl-2,3,5,6-tetraiodobenzoyl)-morpholine (Compound B) and Homologs 3.48 g Morpholine were added drop by drop to a solution of 14.12 g tetraiodoterephthaloyl dichloride (0.020 mole) in 154 ml dimethylformamide at 20° C. The reaction was permitted to proceed for 30 minutes, and ice water was then added until no further precipitation occurred. The resulting suspension was acidified with 2 N HCl and filtered with suction. The solid recovered and dried (14.56 g) consisted of 4-(4-chloroformyl-2,3,5,6-tetraiodobenzoyl)-morpholine, a little tetraiodotetraphthaloyl dimorpholide, and unreacted tetraiodoterephthaloyl dichloride. It was dissolved in 250 ml chloroform and extracted with a total of 30 ml concentrated sulfuric acid. 6.4 g. Pure tetraiodoterephthaloyl dichloride were recovered from the chloroform phase after washing with water and evaporation of the solvent.

The sulfuric acid extract was poured over ice, and a finely crystalline precipitate was formed. It was filtered off with suction and repeatedly washed with water. It consisted of tetraiodotetraphthaloyl monomorpholide and a small amount of the dimorpholide. It was heated to boiling with sufficient 1 N NaOH (53 – 54 ml) to make the pH 8.5 – 9. The undissolved dimorpholide was removed by filtration of the hot mixture, and the filtrate was mixed with an excess of hydrochloric acid to precipitate the monomorpholide. It was recovered in an amount of 6.1 g, had a melting point of 193° – 198° C, and was identified by elementary analysis:

| | | |
|---|---|---|
| Calculated for $C_{12}H_8I_4NO_4 \cdot H_2O$ | 19.0% C; | 66.9% I |
| Found | 18.9 | 66.4 |

It can be purified, if so desired, by crystallizing the sparingly soluble sodium salt from water.

5 g Tetraiodoterephthaloyl monomorpholide were mixed with 10 ml phosphorus oxychloride and 6 g phosphorus pentachloride. The chlorination mixture was held at 100° to 105° C for two hours. The almost clear solution was then evaporated in a vacuum, and the residue was carefully transferred to ice. The crude acyl chloride so obtained was purified by briefly suspending it in warm, dilute sodium hydroxide solution in which unreacted tetraiodoterephthaloyl monomorpholide was dissolved. The suspension, while still hot, was filtered with suction, and the recovered solid intermediate was washed with much water. When dried, it weighed 4.4 g (88 percent yield) and consisted of chromatographically pure 4-4-chloroformyl-2,3,5,6-tetraiodobenzoyl)-morpholine of M.P. 260° – 265° C. the compound was identified by elementary analysis:

| | | |
|---|---|---|
| Calc. for $C_{12}H_8ClI_4NO_3$ | 19.0% C; | 5 equ. total halogen |
| Found | 19.3 | 4.9 |

A mixture of 12.5 g of the last-mentioned intermediate in 190 ml dimethylformamide with 5.41 g DL-norvaline in 41.5 ml 1-N NaOH was stirred for four hours at 100° C. 700 Ml dilute hydrochloric acid containing 45 ml 1-N HCl were added, and the resulting precipitate was filtered with suction at 0° C and well washed with water. It was dissolved in aqueous sodium hydroxide solution and reprecipitated from the filtered solution with an excess of hydrochloric acid, and the 11.6 g of impure Compound B were further purified by recrystallization from 55 ml ethanol. The yield was 9.5 g (69 percent) of pure Compound B melting at 278° – 280° C, and having an $R_f$ value of 0.90 in a thin layer chromatogram on silica gel (acetone/chloroform/glacial acetic acid = 5:4:1). All $R_f$ values reported hereinbelow were obtained on the same substrate with the same solvent system, unless stated otherwise.

The compound is insoluble in water, only sparingly soluble in most organic solvents, but readily soluble in dimethylsulfoxide. It was identified by elementary analysis:

| | | |
|---|---|---|
| Calculated for $C_{17}H_{18}I_4N_2O_3$ | 24.4% C; | 60.6% I |
| Found | 24.4 | 60.8 |

At 20° C, the solubility of the sodium salt is 33 g/dl, that of the N-methylglucamine salt 30 g/dl.

Compound C was obtained when L-leucine was substituted in the above procedure for DL-norvaline, and Compound A from DL-aminobutyric acid. The expected 4-(4-N-carboxyalkylcarbamyl-2,3,5,6-tetraiodobenzoyl)-morpholines in which alkyl was — $CH_2$— (Compound AA), —$CH_2$—$CH_2$— (BB), and —$CH_2$—$CH_2$—$CH_2$— (CC) were obtained in an analogous manner by using glycine, β-alanine, and γ-aminobutyric acid respectively.

The five last-mentioned acids were identified by their elementary analyses, were recovered in yields varying between 44.5 percent and 83 percent, and had the following characteristic properties:

| Compound | M.P. °C | $R_f$ |
|---|---|---|
| C | 282 – 283.5 | 0.91 |
| A | 268 – 271 | 0.94 |
| AA | 292 – 295 | 0.81 |
| BB | 275 – 281 | 0.91 |
| CC | 268 – 271 | 0.94 |

The sodium and N-methylglucamine salts of the five acids tabulated above are soluble in water at 20° C, while the free acids are insoluble in water. Compound C is soluble in lower alkanols, acetone and glacial acetic acid, but only trace amounts dissolve in ethers and hydrocarbons. Compound A is somewhat soluble in hot methanol, but only slightly soluble in other common organic solvents. Compound CC is insoluble in most organic solvents.

EXAMPLE 2

4-(4N-Methyl-N-carboxymethylcarbamyl-2,3,5,6-tetraiodobenzoyl)-morpholine (Compound D)

21.3 g Sarcosine ethyl ester in 300 ml chloroform were refluxed for five hours with 34.0 g 4-(4-chloroformyl-2,3,5,6-tetraiodobenzoyl)-morpholine. The chloroform solution was extracted with dilute hydrochloric acid and with water and was thereafter evaporated to dryness. The residue (30.5 g) consisted of the ethyl ester of Compound D which was identified by elementary analysis.

| | | |
|---|---|---|
| Calculated for $C_{17}H_{20}I_4N_2O_3$ | 24.3% C; | 3.34% N |
| Found | 24.2 | 3.08 |

The crude ester was hydrolyzed in a boiling solution prepared from 63 ml 3-N methanolic NaOH solution 135 ml methanol and 54 ml aqueous, 1-N sodium hydroxide solution. The sodium salt of Compound D precipitated from the hydrolyzation mixture, was filtered off with suction, washed with a little methanol and dissolved in pure water. The chromatographically pure Compound D was precipitated from the clear solution with an excess of 2-N hydrochloric acid in an amount of 17.4 g (48 percent yield) and had a melting point of 287° – 289° C. Its thin layer chromatogram gave an $R_f$ value of 0.4.

The free acid is insoluble in water, somewhat soluble in hot methanol but very sparingly soluble in other common organic solvents.

EXAMPLE 3

4-(4-γ-Carboxypiperidinocarbonyl-2,3,5,6-tetraiodobenzoyl)-morpholine (Compound E)

18.95 g (0.025 Mole) 4-(4-chloroformyl-2,3,5,6-tetraiodobenzoyl)-morpholine and 17.3 g ethyl piperidine-4-carboxylate (0.11 mole) were dissolved in 260 ml dioxan, and the solution was heated at 70° C for two hours. 275 Ml water were added dropwise, and the mixture was cooled to 0° C. 29.65 g Pure ethyl ester of Compound E precipitated. It was saponified at boiling temperature in 250 ml dioxan with 100 ml 2.85 N methanolic sodium hydroxide solution and 40 ml water. The solution of the sodium salt was mixed with 150 ml water, and 400 ml 2 N hydrochloric acid were added to precipitate the free acid which was filtered with suction at 0° C and washed with water.

24.07 g Compound E were recovered (55 percent yield). The Compound has a melting point of 304° – 306° C and was identified by its equivalent weight found to be 850 (calculated 848). Its $R_f$ value was 0.64. The compound is insoluble in water and in most organic solvents.

EXAMPLE 4

4-[4-(2'-Carboxypyrrolidino)-carbonyl-2,3,5,6-tetraiodobenzoyl]-morpholine (Compound F)

A mixture of 37.85 g (0.050 mole) 4-(4-chloroformyl-2,3,5,6-tetraiodobenzoyl)-morpholine, 12.9 g (0.090 mole) L-proline ethyl ester, 5.05 triethylamine, and 250 ml dichloroethane was refluxed with agitation for 12 hours. The reaction mixture was cooled to ambient temperature, extracted with three batches of 200 ml 0.2 N hydrochloric acid and repeatedly extracted with water. The clear solution was dried over desiccated sodium sulfate and evaporated to dryness. The residue having a light buff color was recrystallized from 100 ml ethanol. 32.85 g 4-[4-(2'-carbethoxypyrrolidine)-carbonyl-2,3,5,6-tetraidobenzoyl]-morpholine of M.P. 237° – 232° C (76 percent yield) were recovered, and consisted of a mixture of two isomers.

28.0 Grams of the ethyl ester were saponified while suspended in 150 ml boiling ethanol to which 50 ml 1-N NaOH solution were gradually added. The resulting clear solution was diluted with 100 ml water and was further refluxed gently for 30 minutes. The almost colorless solution was evaporated to dryness, the residue was dissolved in water, and the aqueous solution was purified with active carbon, and acidified with an excess of 2 N HCl. The precipitated Compound F was filtered off with suction and washed with water until free from chloride.

22.1 g Compound F were recovered (81 percent yield). The Compound sintered at above 230° C and decomposed at 275° C. The two isomers had respective $R_f$ values of 0.67 and 0.76. An equivalent weight of 836 was found (calculated for $C_{17}H_{16}I_4N_2O_5$: 835.2).

EXAMPLE 5

4-N-Methylcarbamyl-2,3,5,6-tetraiodobenzoyl-aminoacetic acid (Compound DD)

A boiling solution of 19.8 tetraiodoterephthaloyl dichloride in 315 ml chloroform was mixed with 5.2 g 33 percent methylamine in chloroform. The mixture was stirred at the boiling temperature for 40 minutes, and the precipitate formed was filtered off with suction and washed with chloroform. It was extracted repeatedly with a total amount of 250 ml boiling dioxan, and the dioxan solution was evaporated until the viscous residue of crude 4-N-methyl-carbamyl-2,3,5,6-tetraiodobenzoyl chloride was obtained. When treated with acetone, the chloride crystallized. It was recrystallized from 140 ml dimethylformamide and 400 ml acetone. The pure compound weighed 12.6 g (64 percent yield) and melted at 288° – 291° C.

14.0 g Chloride prepared as described in the preceding paragraph and 4.53 g glycine were suspended in 200 ml dimethylformamide and 60 ml 1.0 N sodium hydroxide, and the mixture was stirred for six hours at 105° – 108° C, whereby a clear solution was formed. 80 Ml hydrochloric acid (1:1) were added drop by drop, and the reaction mixture obtained was cooled. The suspension formed thereby was filtered with suction at 20° C, and the crude precipitate of Compound DD on the filter was washed with 25 ml aqueous dimethylformamide (1:1). It was then recrystallized from 45 ml dimethylformamide, and the finely crystalline compound was recovered by suction filtration, washed with ethyl acetate and dried in a vacuum at 100° – 120° C.

It weighed 18.05 g (61 percent yield), had a melting point above 320° C, and an $R_f$ value of 0.7. It was identified by elementary analysis:

| | | |
|---|---|---|
| Calculated for $C_{11}H_8I_4N_2O_4$ | 17.9% C; | 68.6% I |
| Found | 18.1 | 68.6 |

EXAMPLE 6

N-(4-N'-Methylcarbamyl-2,3,5,6-tetraiodobenzoyl)-N-methylaminoacetic acid (Compound EE)

21.04 g (0.03 Mole) 4-N-methylcarbamyl-2,3,5,6-tetraiodobenzoyl chloride were dissolved in 500 ml dioxan at 20° C. 14.1 g Sarcosine ethyl ester were added, and the mixture was stirred at 20° – 25° C for about 42 hours, and thereafter for 3 hours at 80° C. It was then cooled to ambient temperature, and the unreacted sarcosine ester was precipitated as the hydrochloride by means of an excess of HCl in ether and removed by filtering. The filtrate was evaporated until a viscous, sirupy residue was obtained. When diethyl ether was added, the residue crystallized. It was filtered with suction, and 23.8 g of the crude ethyl ester of Compound EE were obtained. After recrystallization from 300 ml methylethylketone, 13.8 g of the pure ester were obtained. It sintered at 126° – 137° C, and melted at 233° – 235° C.

It was saponified in hot methanolic sodium hydroxide solution to which water was added gradually at a rate to keep the solution clear. After 15 minutes of refluxing, the saponification mixture was evaporated to dryness, and the residue was dissolved in water from which the free acid (Compound EE) was precipitated by an excess of hydrochloric acid. It weighed 12.8 g (56 percent yield), melted at 288° – 291° C, had an $R_f$ value of 0.75, and was identified by elementary analysis.

| | | |
|---|---|---|
| Calculated for $C_{12}H_{10}I_4N_2O_4$ | 19.1% C; | 67.3% I |
| Found | 19.3 | 67.2 |

It is insoluble in water and only very slightly soluble in most common organic solvents. The sodium and N-methylglucamine salts readily form aqueous solutions containing 20 – 25 percent of the salts.

EXAMPLE 7

β-(4-N-Methylcarbamyl-2,3,5,6-tetraiodobenzoyl)-amino-α-phenylpropionic acid (Compound G)

A solution of 35.0 g 4-N-methylcarbamyl-2,3,5,6-tetraiodobenzoyl chloride (0.05 mole) in 250 ml dimethylformamide was mixed with 14.5 g ethyl α-phenyl-β-aminopropionate and 7.6 g triethylamine. The mixture was kept for 90 minutes at 90° – 95° C, whereupon 600 ml water and 100 ml 2 N hydrochloric acid were added. A brownish-buff precipitate formed and was filtered off with suction at 0° C. It was crystallized from 150 ml hot dimethylformamide by adding 250 ml acetone in an amount of 30.6 g (71.5 percent yield) as ethyl-β-(4-N'-methylcarbamyl-2,3,5,6,-tetraiodobenzoyl)-amino-α-phenylpropionate of M.P. 342° – 348° C.

27.0 Grams of the ethyl ester of Compound G were suspended in 675 ml ethanol, the suspension was heated to refluxing temperature, and 450 ml 1 N sodium hydroxide solution were slowly added. A solution was formed and was refluxed for an additional 2.5 hours. Ultimately, 50 ml water were added, and the saponification mixture was cooled to room temperature, whereby 15.1 g pure sodium salt of Compound G were precipitated in crystalline form. The crystals were dissolved in water, and the free Compound G was precipitated by an excess of hydrochloric acid 1:1. It was filtered off with suction, washed with much water and dried.

Compound G was obtained in an amount of about 13 g (35.5 percent yield), melted at 301° – 303° C, and gave an $R_f$ value of 0.94. It was identified by elementary analysis.

| | | | |
|---|---|---|---|
| Calculated for $C_{18}H_{14}I_4N_2$ | 26.0% C; | 3.4% N; | 61.2% I |
| Found | 26.2 | 3.6 | 61.1 |

EXAMPLE 8

1-(4-N-Methylcarbamyl-2,3,5,6-tetraiodobenzoyl)-pyrrolidine-2-carboxylic Acid (Compound H)

A suspension of 28.0 g 4-N-methylcarbamyl-2,3,5,6-tetraiodobenzoyl chloride and 11.51 g L-proline in 450 ml dimethylformamide and 100 ml 1.0 N sodium hydroxide solution was stirred for 3.5 hours at 100° – 105° C. A clear, yellow solution was obtained. When the reaction was completed, 120 ml 1 N hydrochloric acid in 1,000 ml water were added, and the mixture was cooled until crude Compound H was crystallized. It was filtered off with suction and repeatedly washed with water (21.2 g).

It was purified by treatment with 150 ml hot ethanol which appeared to cause a change in the crystal structure and in the geometrical configuration of the crystals. When filtered from the mother liquor and washed with ethanol, 17.2 g of the pure Compound H were obtained (55 percent yield), The compound melts at 220° – 221° C and gave an $R_f$ value of 0.825. It was identified by elementary analysis:

| | | |
|---|---|---|
| Calculated for $C_{14}H_{12}I_4N_2O_2$ | 21.6% C; | 65.1% I |
| Found | 21.6 | 65.0 |

The acid is insoluble in water and soluble in boiling lower alkanols. The sodium salt forms 20 percent aqueous solutions at room temperature, the N-methyl-glucamine salt 50 percent solutions.

EXAMPLE 9

N-(4-N'-Carboxymethylcarbamyl-2,3,5,6-tetraiodobenzoyl)-N-methylamino acetic Acid (Compound I)

18.0 g (0.0255 Mole) tetraiodoterephthaloyl dichloride were dissolved in 80 ml dry tetrahydrofuran, and 5.6 g ethyl aminoacetate were added. The reaction mixture was stirred 48 hours at ambient temperature, the resulting suspension was filtered, and the precipitate was washed twice on the filter with 20 ml tetrahydrofuran. The filtrate and washings were evaporated to a volume of 55 ml, and 40 ml petroleum ether (B.P. 60° – 90° C) were added to the boiling concentrate. A voluminous white precipitate was formed. It was filtered off at 20° C with suction and washed with a 1:1 mixture of tetrahydrofuran and petroleum ether.

Almost pure 4-N-carbethoxymethyl-carbamyl-2,3,5,6-tetraiodobenzoyl chloride of M.P. 231°–233° C was obtained in a yield of 13 g (66 percent). When recrystallized from chlorobenzene, it melted at 234° – 236° C. A thin layer chromatogram on silica gel gave an $R_f$ value of 0.8 with hexane/chloroform/glacial acetic acid 5:4:1.

36.9 g (0.045 Mole) 4-N-carbethoxymethylcarbamyl-2,3,5,6-tetraiodobenzoyl chloride were heated in 360 ml dimethylformamide to 100° C and 16.0 g sarcosine ethyl ester were added. The mixture was kept at 100° – 105° C for two hours, and the resulting clear solution was poured over a large amount of ice containing an excess of hydrochloric acid. The precipitated crude di-ester of Compound I was filtered off, dried, dissolved in 100 ml hot dimethylformamide, and crystallized in purified form by adding 200 ml acetone. It was filtered off at 0° C and washed repeatedly with acetone. The pure ester was obtained in an amount of 29.5 g and melted at 22° – 229° C.

The ester was suspended in 215 ml ethanol, and 104 ml 1.0 N sodium hydroxide solution were added to the suspension at refluxing temperature, whereby a clear solution was obtained. After about an hour, the solution was evaporated to dryness, the residue was dissolved in 200 ml water, and free Compound I was precipitated from the solution of the sodium salt by adding 130 ml 1 N hydrochloric acid. It was recovered in an amount of 22.3 g (62 percent yield), melted at 199° – 201° C and gave an $R_f$ value of 0.488. It was identified by its equivalent weight and by elementary analysis:

| | | | |
|---|---|---|---|
| Calculated for $C_{13}H_{10}N_2I_4O_6$ | eq. wt. 399; | 19.6% C; | 63.6% I |
| Found | 398 | 19.7 | 63.5 |

The free acid is hardly soluble in water, but dissolves readily in boiling lower alkanols, in acetone, and in glacial acetic acid. Aqueous solutions containing up to 40 percent of the sodium salt are readily formed at room temperature.

EXAMPLE 10

N-(4-N'-Carboxymethylcarbamyl-2,3,5,6-tetraiodobenzoyl)-N-ethylamino-acetic Acid (Compound M) and Homologs (Compound K)

When sarcosine ethyl ester was replaced in the general procedure of Example 9 by the corresponding ethylaminoacetic acid ester, Compound M was obtained.

38.7 g 4-N-Carbethoxymethylcarbamyl-2,3,5,6-tetraiodobenzoyl chloride, 13.1 g ethyl N-ethylaminoacetate, and 5.0 g triethylamine were stirred in 260 ml dimethylformamide at 100° C for four hours. The reaction mixture was poured into 1,500 ml water containing 250 ml 2 N hydrochloric acid. The precipitated, finely crystalline diester was filtered off with suction, washed with water and recrystallized from ethanol. 19.2 g N-(4-N'-Carbethoxymethylcarbamyl-2,3,5,6-tetraiodobenzoyl)-N-ethylaminoacetic acid ethyl ester (44.3 percent yield) were obtained and melted at 186° – 187.5° C.

15.0 g (0.017 Mole) of the diester were hydrolyzed in 150 ml ethanol with 52 ml 1.0 N aqueous sodium hydroxide solution and two additions of 50 ml water. Refluxing was continued for 30 minutes after the last water addition, and the solution was evaporated to dryness. The residue was dissolved in 200 ml water, and 6 ml concentrated hydrochloric acid were added to the solution of the sodium salt to precipitate crude Compound M which was filtered off and washed with water until free from chloride. It weighed 13.0 g (94.2 percent yield), had a melting point of 245° – 253° C, and gave an $R_f$ value of 0.40. It was identified by elementary analysis:

| | | |
|---|---|---|
| Calculated for $C_{14}H_{12}I_4N_2O_6$ | 20.7% C; | 62.5% I |
| Found | 20.5 | 62.4 |

The free acid is insoluble in water, soluble in boiling lower alkanols, acetone, warm ethyl acetate and glacial acetic acid. The sodium and N-methylglukamine salts freely dissolve in water (<<20 g/dl).

α-Ethyl-β-aminopropionic acid ethyl ester when substituted for the N-ethylaminoacetic acid ester gave β-(4-N-carbethoxymethylcarbamyl-2,3,5,6-tetraiodobenzoyl)-amino-α-ethylpropionic acid ethyl ester of M.P. 300° – 302° C, in a yield of 86 percent. The diester was saponified to the sodium salt as described above, and the free acid, β-(4-N-carboxymethylcarbamyl-2,3,5,6-tetraiodobenzoyl)-amino-α-ethylpropionic acid (Compound K) of M.P. 293° – 295° C (Decomp.) and $R_f$ 0.64 was obtained and identified by elementary analysis. It is insoluble in water, and insoluble or only sparingly soluble in the usual organic solvents. Aqueous solutions stronger than 25 percent are readily prepared at room temperature from the sodium and N-methylglucamine salts.

EXAMPLE 11

1-(4-N-Carboxymethylcarbamyl-2,3,5,6-tetraiodobenzoyl)-pyrrolidine-2-carboxylic acid (Compound O) and analogous compounds (Compound N)

The proline ethyl ester used in a procedure closely similar to those of Examples 9 and 10 gave Compound O.

A solution of 26.5 g (0.0343 mole) 4-N-carbethoxymethylcarbamyl-2,3,5,6-tetraiodobenzoyl chloride [4-(4-chloroformyl-2,3,5,6-tetraiodobenzoylaminoacetic acid ethyl ester], 9.84 L-proline ethyl ester, and 2.50 g triethylamine in 220 ml 1,2-dichloroethane was held at 78° – 80° C for 15 hours. The reaction mixture was extracted twice with 200 ml 0.2 N hydrochloric acid and five times with 100 ml water and evaporated to dryness. The residue was crystallized twice from its hot saturated solutions in ethanol, and 18.7 g chromatographically pure 1-(4-N-carbethoxymethylcarbamyl-2,3,5,6-tetraiodobenzoyl)-pyrrolidine-2-carboxylic acid ethyl ester (62.0 percent yield) were obtained. The compound sintered to a transparent mass at 138° – 145° C.

5.90 g Diester in 30 ml ethanol were mixed hot with 30 ml 1.0 N sodium hydroxide solution within five minutes. The solution so obtained was diluted with 30 ml water and refluxed for 1.5 hours. It was then evaporated until very viscous, dissolved in water, clarified with active carbon, and acidified with an excess of hydrochloric acid. The precipitated Compound O was filtered off with suction and repeatedly washed with water. The yield was 4.90 g (90.5 percent). The compound melted at above 230° C (Decomp.) and gave an $R_f$ value of 0.44. It was identified by its equivalent weight of 418 (calculated 421 for $C_{15}H_{12}I_4N_2O_6 \cdot H_2O$). The sodium and N-methylglucamine salts easily dissolve in water at room temperature.

In an analogous manner, the crude diethyl ester of N-(4-N'-carboxymethylcarbamyl-2,3,5,6-tetraiodobenzoyl)-N-benzylaminoacetic acid (Compound N) was obtained from N-benzylaminoacetic acid ethyl ester in a yield of 88 percent and melted at 170° – 176° C. When purified by boiling in acetone, dissolution in hot dimethylformamide and precipitation with ethanol, the diester melted at 197° – 199° c and was identified by elementary analysis. The free acid obtained as the monohydrate by hydrolysis as above in a yield of 89 percent melted at 173° – 175° C, had a $R_f$ value of 0.55, and was identified by its equivalent weight and elementary analysis. It is practically insoluble in water, acetone, ethyl acetate, the lower alkyl ethers, chloroform and low boiling petroleum fractions, but dissolves readily in warm methanol, ethanol, isopropanol or glacial acetic acid. The sodium and N-methylglucamine salts are so easily soluble in water that solutions containing more than 40 g/dl at 20° C may be prepared.

EXAMPLE 12

β-(4-N-Carboxymethylcarbamyl-2,3,5,6-tetraiodobenzoyl)-amino-α-phenylpropionic Acid (Compound L)

A solution of 27.1 g (0.035 mole) 4-N-carbethoxymethylcarbamyl-2,3,5,6-tetraiodobenzoyl chloride, 13.6 g (0.070 mole) α-phenyl-β-aminopropionic acid ethyl ester and 3.5 g (0.035 mole) freshly distilled triethylamine in 175 ml dimethylformamide was stirred at 100° C for 12 – 14 hours. The deeply red reaction solution was stirred into a mixture of 850 ml water and 150 ml 2 N hydrochloric acid, whereby a reddish-buff crude diester was precipitated. It was filtered off, dried and recrystallized from 55 ml dimethylformamide and 150 ethanol. The yield was 21.7 g (66.5 percent), the melting point 297° – 300° C.

15.0 g Diester were dissolved in 79.5 concentrated sulfuric acid at slightly elevated temperature. The clear solution was poured over 15.8 g ice, and the diluted liquid was added dropwise with vigorous stirring to 950 ml 2 N sodium hydroxide at 70° – 90° C. After 15 minutes, the solution was clarified with active carbon and mixed with 100 ml 2 N hydrochloric acid to precipitate Compound L which was filtered off and purified by dispersing it in several changes of hot water. When dried, it weighed 11.4 g (81 percent yield), had a melting point of 288° – 289° C (decomp.), and an $R_f$ value of 0.64. It was identified by its equivalent weight and elementary analysis:

| Calc. for $C_{19}H_{14}I_4N_2O_6$; | eq. wt. 437; | 26.1% C; | 58.1% I |
|---|---|---|---|
| Found | 431 | 25.9 | 57.6 |

The free acid is insoluble in water and only sparingly soluble in most common organic solvents. Solutions of the sodium and N-methyl-glucamate salts containing 25 g/dl or more at room temperature are readily prepared.

When the diester was saponified in the manner of the preceding examples by heating with ethanol and aqueous sodium hydroxide solution, a mixture of two isomeric acids having different crystal forms was obtained. A unitary compound free from isomers was prepared by first dissolving the diester in concentrated sulfuric acid.

EXAMPLE 13

1-(4-N-methyl-N-carboxymethylcarbamyl-2,3,5,6-tetraiodobenzoyl)-pyrrolidine- 2-carboxylic acid (Compound R)

245.4 g (0.347 Mole) tetraiodoterephthaloyl dichloride in 3,000 ml chloroform free from alcohol were mixed with 43 g (0.367 mole) N-methylaminoacetic acid ethyl ester and 35.15 g (0.347 mole) triethylamine. The mixture was stirred at boiling temperature for 7 hours, cooled to ambient temperature, filtered, and washed with dilute hydrochloric acid and water. It contained unreacted tetraiodoterephthaloyl dichloride, 4-(N-methyl-N-carbethoxymethyl)-carbamyl-2,3,5,6-tetraiodobenzoyl chloride (Compound a) and 1,4-bis-(N-methyl-N-carbethoxymethyl)-carbamyl-2,3,5,6-tetraiodobenzene (Compound b).

The chloroform solution was extracted repeatedly with small amounts (25 – 50 ml) concentrated sulfuric acid, whereby Compounds a and b were dissolved in the sulfuric acid phase and the acyl chloride group of Compound a was hydrolyzed to the carboxyl group. The unchanged starting material remained in the chloroform solution and was recovered from the same in an amount of 45.3 g by evaporation to dryness and washing of the residue with diethyl ether.

The combined sulfuric acid extracts were stirred into 1 kg ice, and the resulting precipitate was extracted with chloroform. The residue consisted of 70 g 4-(N-methyl-N-carbethoxymethyl)-carbamyl-2,3,5,6-tetraiodobenzoic acid of M.P. 228° – 229° C (decomp.) (Compound a'). The chloroform extract containing Compound b and more than half of Compound a' was stirred with 400 ml water, and 1.0 N sodium hydroxide solution was added in small amounts so as not to raise the pH beyond 8 to 9. Compound b remained unchanged, and Compound a' entered the aqueous phase as the sodium salt. Saponification of the ester groups was avoided by keeping the temperature low and controlling pH.

The weakly alkaline aqueous phase was washed with diethyl ether, filtered, purged of dissolved ether in a vacuum and acidified with hydrochloric acid. 4-N-Methyl-N-carbethoxymethylcarbamoyl-2,3,5,6-tetraiodobenzoic acid was thereby precipitated in an amount of 99 g, M.P. 227° – 228° C, for a total yield of 169 g (77.5 percent).

The 169 g 4-N-methyl-N-carbethoxymethylcarbamyl-2,3,5,6-tetraiodobenzoic acid recovered in two batches, as described above, were mixed with 750 ml thionyl chloride, and the mixture was kept boiling for 1 – 2 hours with agitation. The excess of thionyl chloride was evaporated, and the residue was repeatedly dissolved in chloroform free from alcohol and recovered by evaporation to dryness. It was ultimately washed with petroleum ether, and 179 g 4-N-methyl-N-carbethoxymethylcarbamyl-2,3,5,6-tetraiodobenzoyl chloride of M.P. 160° – 161° C were obtained.

70.86 g (0.09 Mole) of the last-prepared acyl chloride, 19.78 g (0.135 mole) L-proline ethyl ester, and 9.11 g (0.09 mole) triethylamine in 500 ml 1,2-dichloroethane were kept at the boiling temperature with agitation for eight hours. The reaction mixture was extracted with hydrochloric acid and water, dried, and evaporated to dryness. The residue was dispersed in diethylether and recovered in purified condition. It weighed 65.7 g (81.5 percent yield) and consisted of the diethyl ester of Compound R sintering at 115° – 120° C, partly melting at 133° – 157° C, and decomposing at 180° – 205° C. A thin layer chromatogram on silica gel with hexane/chloroform/glacial acetic acid 5:4:1 revealed the presence of two isomers having $R_f$ values of 0.69 and 0.45 respectively. The more soluble isomer was extracted with 150 ml boiling isopropanol, and the residue weighing 31.3 g melted at 217° – 219° C and had an $R_f$ value of 0.68. It was identified by microanalysis:

| Calculated for $C_{20}H_{22}I_4N_2O_6$: | 26.7% C; | 56.79% I |
|---|---|---|
| Found | 26.95 | 57.01 |

It dissolves only slightly in water, lower alcohols, ethers, acetone and ethyl acetate, but is readily soluble in chloroform and warm glacial acetic acid.

30 g Diester ($R_f = 0.68$) were hydrolyzed in 150 ml ethanol by means of 84 ml 1.0 N sodium hydroxide solution and 150 ml water, and the saponification mixture was evaporated to dryness. The residual sodium salt was dissolved in water, and the solution was filtered and acidified to precipitate Compound R in an amount of 26.6 g (94.5 percent yield). It sintered at 214° – 217° C, melted at 223° – 224°C (decomp.), and had an $R_f$ value of 0.47. It was identified by elementary analysis:

| Calculated for $C_{16}H_{14}I_4N_2O_6$: | 22.94% C; | 60.59% I |
|---|---|---|
| Found: | 22.78 | 60.33 |

The free acid is practically insoluble in water, only slightly soluble in ether, low-boiling petroleum fractions, and ethyl acetate, but readily soluble in lower alkanols, acetone, chloroform and glacial acetic acid. The sodium and N-methylglucamine salts are freely soluble in water so that solutions containing more than 50 g/dl at 20° C may be prepared

EXAMPLE 14

β-[4-(2'-Carboxypyrrolidine)-carbonyl-2,3,5,6-tetraiodobenzoyl]-aminoα-ethylpropionic acid (Compound Q)

In the procedure of Example 13, N-methylaminoacetic acid ethyl ester was replaced with L-proline ethyl ester. 4-(2'-Carbethoxypyrrolidino)-carbonyl-2,3,5,6-tetraiodobenzoyl chloride of M.p. 96° – 99° C was obtained as an intermediate from the corresponding benzoic acid derivative of M.P. 184° – 185° C.

55.2 g (0.071 Mole) of the acyl chloride were refluxed in 300 ml chloroform with 15.5 g (0.107 mole) β-amino-α-ethylpropionic acid ethyl ester and 7.2 g (0.071 mole) triethylamine for 18 hours. The reaction mixture was extracted with hydrochloric acid and water, dried, and evaporated to dryness. Crude β-[4-(2'-carbethoxypyrrolidino)-carbonyl-2,3,5,6-tetraiodobenzoyl]-amino-α-ethylpropionic acid ethyl ester was recovered in a yield of 65.3 g (100 percent). It was dissolved in 25 ml warm methylisobutylketone, and the solution was cooled until crystallization started. 150 Ml diethyl ether were then gradually added. The crystals of the pure diester were recovered, weighed 54.25 g (83 percent yield), and had a melting point of 176° – 178° C. $R_f = 0.6$ (hexane/chloroform/glacial acetic acid 5:4:1). The diester was identified by microanalysis:

| | | |
|---|---|---|
| Calculated for $C_{22}H_{26}I_4N_2O_6$: | 28.66% C; | 55.07% I |
| Found | 28.75% | 55.12% |

The free acid was obtained by saponifying 54 g diester in 300 ml boiling ethanol with 140 ml 1 N sodium hydroxide solution and 300 ml water added at a rate to keep the solution clear, and acidifying the solution of the sodium salt so obtained, as described in more detail in Example 13. Compound Q was recovered in an amount of 46.85 g (92.4 percent yield). M.P. 197° – 198° C. $R_f = 0.63$. It was identified by elementary analysis and equivalent weight:

| | | | |
|---|---|---|---|
| Calc. for $C_{18}H_{18}I_4N_2O_6$: | eq. wt. 433; | 24.97% C; | 58.62% I |
| Found: | 423.9 | 24.63 | 58.23 |

The acid is insoluble in water, very slightly soluble in chloroform, ethers and benzene, but readily soluble in methanol, ethanol, acetone, and glacial acetic acid.

EXAMPLE 15

β-[4-(2'-Carboxypyrrolidino)-carbonyl-2,3,5,6-tetraiodobenzoyl]-amino-α-ethylpropinionic acid (Compound Q)

The same produce as in Example 14 was also prepared by a different method. 160 g Tetraiodoterephthaloyl dichloride, 50 g α-ethyl-β-aminopropionic acid ethyl ester (ethyl β-aminovalerate) and 23 g triethylamine in 1,500 ml pure chloroform were stirred for 5 hours at boiling temperature. 154 g 4-N-β-carbethoxybutylcarbamyl-2,3,5,6-tetraiodobenzoyl chloride containing some 1,4-bis-β-carbethoxybutylcarbamyl-2,3,5,6-tetraiodobenzene as a by-product were recovered. The crude compound was mixed with 200 ml concentrated sulfuric acid whereby HCl gas was developed and a clear solution was obtained. The solution was stirred into about 2 kg ice, and the resulting precipitate was filtered off with suction, and suspended in 750 ml water. Enough sodium hydroxide solution was added to the suspension until added phenolphthalein indicator showed a permanent pink color. Undissolved material was removed by filtering, and the filtrate was acidified.

119 g 4-N-β-carbethoxybutylcarbamyl-2,3,5,6-tetraiodobenzoic acid were precipitated and recovered. The acid was converted to the acyl chloride by refluxing with 700 g thionyl chloride. The crude benzoyl chloride derivative was obtained by evaporation of the excess thionyl chloride in an amount of 109 g. M.P. 238° – 240° C (decomp.). When recrystallized from chlorobenzene, the compound melted at 240° (decomp.) and had an $R_f$ value of 0.85 (hexane/chloroform/glacial acetic acid = 5:4:1). . It was identified by microanalysis:

| | | |
|---|---|---|
| Calc. for $C_{13}H_{14}ClI_4No_4$: | 22.09% C; | 5 eq./mole halogen |
| Found | 22.27 | 4.93 |

32.1 g L-Proline ethyl ester, 13.3 g triethylamine and 107 g of the acyl chloride were refluxed in 1,500 ml chloroform for 6 hours. The crude diester recovered weighed 101.5 g and had a melting point of 175° C. 99.5 g Diester, when saponified by means of 265 ml 1 N sodium hydroxide solution yielded 89 g (95 percent) Compound Q of M.P. 197.5° – 198° C.

EXAMPLE 16

β-(4-N-Methyl-N-carboxymethylcarbamyl-2,3,5,6-tetraiodobenzoyl)-amino-α-ethylpropionic acid (Compound P)

47.24 g (0.06 Mole) 4-N-methyl-N-carbethoxymethylcarbamyl-2,3,5,6-tetraiodobenzoyl chloride, 14.52 g (0.1 mole) β-amino-α-ethylpropionic acid ethyl ester, and 6.01 g (0.06 mole) triethylamine were reacted in 250 ml dry, boiling chloroform free from alcohol for 30 to 40 hours with agitation. The reaction mixture was extracted with hydrochloric acid and water, dried, and evaporated to dryness. The residue weighing 52.05 g (97 percent yield) was dissolved in 20 ml methylisobutylketone, and crystallization was induced by rubbing with a glass rod, whereupon 500 ml diethyl ether were added.

The pure diester of Compound P was obtained in a yield of 39.1 g (73 percent) and had a melting point of 138° – 139° C and an $R_f$ value of 0.66 (hexane/chloroform/glacial acetic acid = 5:4:1). It was identified by elementary analysis:

| | | |
|---|---|---|
| Calculated for $C_{20}H_{24}I_4N_2O_6$: | 26.81% C; | 56.66% I |
| Found | 26.54 | 56.14 |

37 g Diester when hydrolyzed in 200 ml ethanol with 103 ml 1.0 N sodium hydroxide solution and 150 ml water yielded 30.85 g Compound P (89 percent) of M.P. 190° – 192° C and $R_f = 0.56$ which was identified by elementary analysis:

| | | |
|---|---|---|
| Calculated for $C_{16}H_{16}I_4N_2O_6$: | 22.88% C; | 60.43% I |
| Found: | 22.72 | 59.97 |

The free acid is insoluble in water, slightly soluble in ethers, low-boiling petroleum fractions, chloroform and benzene, but readily soluble in lower alkanols, acetone and glacial acetic acid. The sodium and N-methylglucamine salts form aqueous solutions of more than 50 g/dl at 20° C.

Two or more isomers were found to occur in asymmetrically substituted diamides of tetraiodophthalic acid in instances not specifically described in the preceding examples. They are thought to be due to steric hindrance because of the space occupied by the four iodine atoms attached to the benzene ring. The relatively low yields referred to in some examples are explained by the recovery of the prevailing isomer only.

The compounds of the invention are applied orally or parenterally prior to cholecystography, and are combined with excipients practically transparent to X-rays in compositions in dosage form which may be tablets, granules, capsules, solutions, suspensions or the like, as is conventional in galenic pharmacy. Solid excipients may be compounded with the free acids or with their salts with physiologically tolerated metals and organic bases, and the alkali metal and alkanolamine salts are preferred for the preparation of aqueous solutions though some of the acids form soluble non-toxic salts with metals outside the first group of the Periodic Table of Elements and with many organic bases which are not alkanolamines, such as those commonly combined with therapeutically effective anionic components. The following Examples 17 to 23 are thus merely representative of presently preferred methods of combining the compounds of the invention with conventional excipients.

EXAMPLE 17

An injectable composition of the invention was prepared from the following ingredients:

| | |
|---|---|
| Compound I | 399 g |
| N-Methylglucamine | 48.8 g |
| Sodium hydroxide | 30 g |
| Disodium edetate | 0.2 g |
| Bidistilled water | to make 100 ml |

The disodium edetate was dissolved in a small portion of the water, and the other ingredients were added with stirring in the order in which they are listed above. The solution was adjusted to pH 7.1 ± 0.25, ultrafiltered, transferred to glass vials in batches of 10 and 20 ml, and sterilized. It contained approximately 250 mg iodine per milliliter.

The solutions were injected generally into the veins of the patient, but intramuscular injection has been used successfully in children where veins of adequate size were not available. The necessary dosage was determined individually in each case and amounted to 2 to 10 g iodine equivalent or about 4 to 20 g of Compound I. With dosage rates at the lower end of the range indicated, the injection was performed slowly over a period of 5 to 16 minutes by means of a syringe. Drop infusion was more practical with more than 5 or 6 g iodine equivalent, and took an hour or longer.

Good cholecystograms were obtained about 30 to 180 minutes after the intravenous injection or 90 to 240 minutes after inception of the infusion, and useful contrast was still found in many X-ray pictures taken 4, 8 and even 24 hours after application of the contrast agent.

The procedure outlined above is equally applicable to injectable solutions of other contrast agents whose preparation is described in the following Examples 18 and 19.

EXAMPLE 18

A solution similar to that of Example 17 was prepared from:

| | |
|---|---|
| Compound M | 406 g |
| N-Methylglucamine | 146.8 g |
| Sodium hydroxide | 10 g |
| Disodium edetate | 0.3 g |
| Bidistilled water | to make 100 ml |

The solution was prepared as in the preceding example, transferred to vials having a capacity of 20 ml or to rubber-capped multiple-puncture vials of 100 and 200 ml capacity and sterilized. It contained about 255 mg iodine per milliliter.

EXAMPLE 19

| | |
|---|---|
| Compound K (monohydrate) | 422 g |
| N-Methylglucamine | 146.8 g |
| Sodium hydroxide | 10 g |
| Disodium edetate | 0.3 g |
| Bidistilled water | to make 100 ml |

An injectable solution was prepared according to the above formulation as described in Example 18 and sterilized in 20 ml vials for use in individual cholecystographic tests and in 100 and 200 multiple-puncture vials. It contained about 255 mg iodine per ml.

EXAMPLE 20

5 kg Compound C were mixed in a kneading machine with 2 liters of an aqueous starch dispersion containing 100 g corn starch. A little solid starch was added to make the moist mixture less tacky. It was then granulated on a granulating machine, and the granules were dried in a vacuum. The finished granulate was mixed with 0.5 kg corn starch and 25 g magnesium stearate, and the mixture was converted on a tableting machine to tablets which contained 500 mg of Compound C.

Four to 12 tablets containing 1 to 3 grams iodine were given to patients on an empty stomach, and cholecystograms were made within 8 to 16 hours after ingestion. The upper limit of the range indicated (3 grams iodine) is usually preferred in adult patients. The same dosage rate applies to the ingestible compositions described below in Examples 21 to 23.

EXAMPLE 21

The sodium salt of Compound H was prepared by mixing solutions of stoichiometrically equivalent amounts of the free acid and of sodium hydroxide with the minimum amount of water necessary to produce a clear solution. Two volumes ethanol were then added, and scraping of the vessel wall with a glass rod induced crystallization of the sodium salt. 5 Kilograms of the salt were intimately mixed with 0.75 kg granulated sugar and 0.75 kg corn starch. The mixture was moistened with 1,000 ml 50 percent aqueous ethanol and granulated on a conventional granulating table.

The granules were dried, sieved, mixed with 0.65 kg corn starch, 0.05 kg talcum and 0.05 kg magnesium stearate, and 10,000 tablets were prepared from the mixture, each tablet containing 500 mg of the active agent and a corresponding amount of the excipient transparent to X-rays.

The sodium salts, lithium salts and calcium salts of the other free acids of the invention are prepared and compounded in an analogous manner. If the addition of ethanol or isopropanol and scraping or seeding should not cause precipitation of a crystalline salt, the aqueous solvent mixture may have to be evaporated in a vacuum, and the residue triturated with isopropanol to cause crystallization.

The water soluble salts of the several free acids of the invention with N-methylglucamine and other organic bases are prepared from stoichiometrically equivalent amounts of acid and base mixed with just enough water or methanol to produce a solution from which the salt is either precipitated by a large excess of ethanol or isopropanol as described above or recovered by evaporation of the solvent. The following Examples 22–24 further illustrate the procedures for making salts of the invention.

EXAMPLE 22

A solution of 15.96 g Compound I (0.020 mole) and 7.81 g (0.040 mole) N-methylglucamine in 100 ml methanol was mixed with 250 ml isopropanol in a glass beaker. The inner wall of the container holding the amorphous suspension formed thereby was scraped with a glass rod, and the contents of the beaker were cooled to 0° C, whereby a crystalline precipitate was obtained. It was recovered by filtration with suction, washed with a little cold isopropanol and dried.

The practically pure salt was used in making solid X-ray contrast agent compositions as described above. A small amount was saved for use in seeding later prepared batches.

EXAMPLE 23

A suspension of 16.88 g (0.02 mole) Compound K in 50 ml methanol was mixed at boiling temperature with 80 ml 0.5 N methanolic sodium hydroxide. The clear solution so obtained was evaporated in a vacuum until crystallization started, whereupon 300 ml isopropanol were added. The disodium salt of Compound K was precipitated in the form of fine crystals which were recovered, dried and tableted as described in Example 21.

EXAMPLE 24

A hot saturated solution of 40.59 g Compound M (0.05 mole) and 19.52 g N-methylglucamine (0.10 mole) in methanol was stirred while being cooled to 0° C and seeded with seed crystals previously prepared by evaporation of a portion of the solution. The crystallized salt was filtered off with suction, washed with a little methanol and dried. It was then granulated and tableted as described above.

EXAMPLE 25

2 g Sodium salt of Compound I were prepared as described in Example 22 and dissolved in 50 g 0.05 percent aqueous sodium chloride solution under sterile condition. The solution so obtained was applied rectally to a child prior to cholecystography, and X-ray images of good contrast were obtained.

The corresponding N-methylglucamine salts of Compound I and of other acids of the invention may similarly be compounded for rectal application with sterile sodium chloride solution.

EXAMPLE 26

Granules prepared by the methods of Examples 20 and 21 were coated with 25 percent (by weight) simple syrup in a dragee-making kettle and were waxed thereafter, as is conventional. The dragees of the two batches contained about 80 percent and 60 percent by weight respectively of the two active agents.

EXAMPLE 27

750 g Compound G were stirred with 600 g sesame oil and 100 g vegetal lecithin to make a paste which was distributed in 1,000 soft gelatin capsules, each capsule containing about 459 mg combined iodine.

The manner of preparing injectable, ingestible, or rectally applied compositions of the invention from the compounds will be readily apparent to those skilled in the art from Examples 17 to 27. The dosage rates will readily be selected to suit the patients weight and condition from the indicated iodine contents.

What is claimed is:

1. A compound which is a member of the group consisting of a diamide of tetraiodoterephthalic acid of the formula

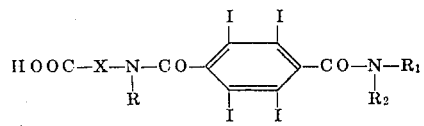

an alkyl ester, and a water-soluble salt of said diamide with a non-toxic alkali metal, a non-toxic alkaline earth metal, or a non-toxic amine, in said formula
 X being alkylene or phenyl-alkylene,
 R being hydrogen, alkyl or phenyl-alkyl, or
 X and R jointly being alkylene,
 $R_1$ being hydrogen or alkyl,
 $R_2$ being alkyl, carboxyalkyl, or carbalkoxy-alkyl, or
 $R_1$ and $R_2$ jointly being alkylenoxy-alkylene, carboxy-alkylene, or carbalkoxyalkylene,
each alkyl and alkylene in said formula having not more than five carbon atoms,
 said HOOC—X—N—R being different from said $R_1$—N—$R_2$.

2. A diamide as set forth in claim 1, wherein said $R_2$—N—$R_1$ is N-carboxymethyl-N-methylamino, N-carboxyethylamino, N-carboxy-methyl-N-ethylamino or 2-carboxy-pyrrolidyl-1.

3. A diamide as set forth in claim 1, wherein X is methylene, and R is methyl.

4. A diamide as set forth in claim 4, wherein said $R_2$—N—$R_1$ is N-2-carboxybutylamino or 2-carboxy-pyrrolidyl-1.

5. A diamide as set forth in claim 1, wherein said HOOC—X—N—R is 2-carboxy-pyrrolidyl-1, and said $R_2$—N—$R_1$ is 2-carboxybutylamino.

6. A compound as set forth in claim 1, which is an alkanolamine salt of said diamide.

7. A compound as set forth in claim 1, which is said diamide or a sodium or N-methylglucamine salt of said diamide.

8. A compound as set forth in claim 1, wherein said diamide is β-(4-N-methyl-N-carboxymethylcarbamyl-2,3,5,6-tetraiodobenzoyl)-amino-α-ethylpropionic acid.

9. A compound as set forth in claim 11, which is said diamide.

10. A compound as set forth in claim 1, wherein said diamide is β-(4-N-carboxymethylcarbamyl-2,3,5,6-tetraiodobenzoyl)-amino-α-ethylpropionic acid.

11. A compound as set forth in claim 1, wherein said diamide is 1-(4-N-methyl-N-carboxymethylcarbamyl-2,3,5,6-tetraiodobenzoyl)-pyrrolidine-2-carboxylic acid.

12. A compound as set forth in claim 1, wherein said diamide is 1-(4-N-methylcarbamyl-2,3,5,6-tetraiodobenzoyl)-pyrrolidine-2-carboxylic acid.

* * * * *